(12) United States Patent
Severson et al.

(10) Patent No.: US 11,132,208 B2
(45) Date of Patent: Sep. 28, 2021

(54) SYSTEM STATE MANAGEMENT

(71) Applicant: QUALCOMM Incorporated, San Diego, CA (US)

(72) Inventors: Matthew Severson, Austin, TX (US); Kangmin Lee, San Diego, CA (US); Cristian Duroiu, San Diego, CA (US); Simon Peter William Booth, San Diego, CA (US); Steven Halter, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 16/689,666

(22) Filed: Nov. 20, 2019

(65) Prior Publication Data
US 2021/0149686 A1 May 20, 2021

(51) Int. Cl.
*G06F 9/44* (2018.01)
*G06F 1/04* (2006.01)
*G06F 9/445* (2018.01)

(52) U.S. Cl.
CPC ............ *G06F 9/44505* (2013.01); *G06F 1/04* (2013.01)

(58) Field of Classification Search
CPC .............................. G06F 9/44505; G06F 1/04
See application file for complete search history.

(56) References Cited

U.S. PATENT DOCUMENTS

| | | | |
|---|---|---|---|
| 2006/0026447 A1* | 2/2006 | Naveh | G06F 1/3296 713/322 |
| 2017/0083262 A1* | 3/2017 | Gadelrab | G06F 3/0661 |

* cited by examiner

*Primary Examiner* — Stefan Stoynov
(74) *Attorney, Agent, or Firm* — Patterson & Sheridan, L.L.P

(57) ABSTRACT

In some aspects, the present disclosure provides a method for bandgap voting. In some configurations, the method includes receiving: (i) a first set of votes from a first client of a system, and (ii) a second set of votes from a second client of the system, wherein the first set of votes indicate a first desired set of operational parameters for controlling a plurality of physical resources in the system, wherein the second set of votes indicate a second desired set of operational parameters for controlling the plurality of physical resources, and wherein the plurality of physical resources are shared by the first client and the second client.

29 Claims, 5 Drawing Sheets

218

302

| System State (SS) | Memory Controller | | | Voltage Rails | |
|---|---|---|---|---|---|
| | MEM NOC | APPS MEM NOC | GPU MEM NOC | VDD CX | VDD MX |
| SS1 | 150 MHz | 150 MHz | 50 MHz | MIN SVS | Nominal |
| SS2 | 200 MHz | 200 MHz | 100 MHz | MIN SVS | Nominal |
| SS3 | 400 MHz | 400 MHz | 200 MHz | MIN SVS | Nominal |

RECEIVING (I) A FIRST SET OF VOTES FROM A FIRST CLIENT OF A SYSTEM, AND (II) A SECOND SET OF VOTES FROM A SECOND CLIENT OF THE SYSTEM, WHEREIN THE FIRST SET OF VOTES INDICATE A FIRST DESIRED SET OF OPERATIONAL PARAMETERS FOR CONTROLLING A PLURALITY OF PHYSICAL RESOURCES IN THE SYSTEM, WHEREIN THE SECOND SET OF VOTES INDICATE A SECOND DESIRED SET OF OPERATIONAL PARAMETERS FOR CONTROLLING THE PLURALITY OF PHYSICAL RESOURCES, AND WHEREIN THE PLURALITY OF PHYSICAL RESOURCES ARE SHARED BY THE FIRST CLIENT AND THE SECOND CLIENT

404

SELECTING A FIRST SYSTEM STATE FROM A DEFINED SET OF SYSTEM STATES BASED ON THE FIRST SET OF VOTES AND THE SECOND SET OF VOTES, WHEREIN EACH SYSTEM STATE OF THE SET OF SYSTEM STATES COMPRISES A DIFFERENT SET OF OPERATIONAL PARAMETERS FOR THE PLURALITY OF PHYSICAL RESOURCES, WHEREIN THE FIRST SYSTEM STATE COMPRISES A FIRST SET OF OPERATIONAL PARAMETERS FOR OPERATING THE PLURALITY OF PHYSICAL RESOURCES

FIG. 4

SYSTEM STATE MANAGEMENT

BACKGROUND

Field of the Disclosure

The teachings of the present disclosure relate generally to managing a plurality of system states in shared resources used by a computing system.

Description of Related Art

Computing devices are becoming more ubiquitous as the devices become more portable. As use of portable devices such as mobile phones, tablets, and laptop computers increases, so too does the functionality required of such devices. For example, while a cellular phone may have a primary function relating to voice and text communications, modern cellular phones may also include peripheral functions such as camera, video, gaming, etc. Accordingly, manufacturers often use shared physical resources to provide power and signaling to the many subsystems that support such functionalities.

However, due to the hardware complexities of portable systems that support such a range of functionalities, a number of system states may increase exponentially. In highly complex computing system, the number of system states can be on the order of hundreds of billions, making testing of each system state or combination of system states infeasible. Accordingly, new and improved circuits, components, systems, and solutions that better meet these and other demands of modern and future computing devices will be beneficial to electronics and computer manufacturers, and their consumers.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some examples, the disclosure provides a method system state management, comprising: receiving (i) a first set of votes from a first client of a system, and (ii) a second set of votes from a second client of the system, wherein the first set of votes indicate a first desired set of operational parameters for controlling a plurality of physical resources in the system, wherein the second set of votes indicate a second desired set of operational parameters for controlling the plurality of physical resources, and wherein the plurality of physical resources are shared by the first client and the second client. In some examples, the method includes selecting a first system state from a defined set of system states based on the first set of votes and the second set of votes, wherein each system state of the set of system states comprises a different set of operational parameters for the plurality of physical resources, wherein the first system state comprises a first set of operational parameters for operating the plurality of physical resources.

In some examples, the disclosure provides an apparatus for system state management. The apparatus includes a memory and a processor communicatively coupled to the memory. In some examples, the processor is configured to: receive (i) a first set of votes from a first client of a system, and (ii) a second set of votes from a second client of the system, wherein the first set of votes indicate a first desired set of operational parameters for controlling a plurality of physical resources in the system, wherein the second set of votes indicate a second desired set of operational parameters for controlling the plurality of physical resources, and wherein the plurality of physical resources are shared by the first client and the second client. In some examples, the processor is configured to select a first system state from a defined set of system states based on the first set of votes and the second set of votes, wherein each system state of the set of system states comprises a different set of operational parameters for the plurality of physical resources, wherein the first system state comprises a first set of operational parameters for operating the plurality of physical resources.

In some examples, the disclosure provides for a non-transitory computer-readable storage medium that stores instructions that when executed by a processor of an apparatus cause the apparatus to perform a method of system state management. In some examples, the method includes receiving (i) a first set of votes from a first client of a system, and (ii) a second set of votes from a second client of the system, wherein the first set of votes indicate a first desired set of operational parameters for controlling a plurality of physical resources in the system, wherein the second set of votes indicate a second desired set of operational parameters for controlling the plurality of physical resources, and wherein the plurality of physical resources are shared by the first client and the second client. In some examples, the method includes selecting a first system state from a defined set of system states based on the first set of votes and the second set of votes, wherein each system state of the set of system states comprises a different set of operational parameters for the plurality of physical resources, wherein the first system state comprises a first set of operational parameters for operating the plurality of physical resources.

In some examples, the disclosure provide for a means for system state management by an apparatus. In some examples, the apparatus includes means for receiving (i) a first set of votes from a first client of a system, and (ii) a second set of votes from a second client of the system, wherein the first set of votes indicate a first desired set of operational parameters for controlling a plurality of physical resources in the system, wherein the second set of votes indicate a second desired set of operational parameters for controlling the plurality of physical resources, and wherein the plurality of physical resources are shared by the first client and the second client. In some examples, the apparatus includes means for selecting a first system state from a defined set of system states based on the first set of votes and the second set of votes, wherein each system state of the set of system states comprises a different set of operational parameters for the plurality of physical resources, wherein the first system state comprises a first set of operational parameters for operating the plurality of physical resources.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 3 is a block diagram conceptually illustrating an example system state table, according to some aspects of the disclosure.

FIG. 4 is a flow chart illustrating an exemplary process for system state aggregation, according to some aspects of the disclosure.

DETAILED DESCRIPTION

Figure 1A:
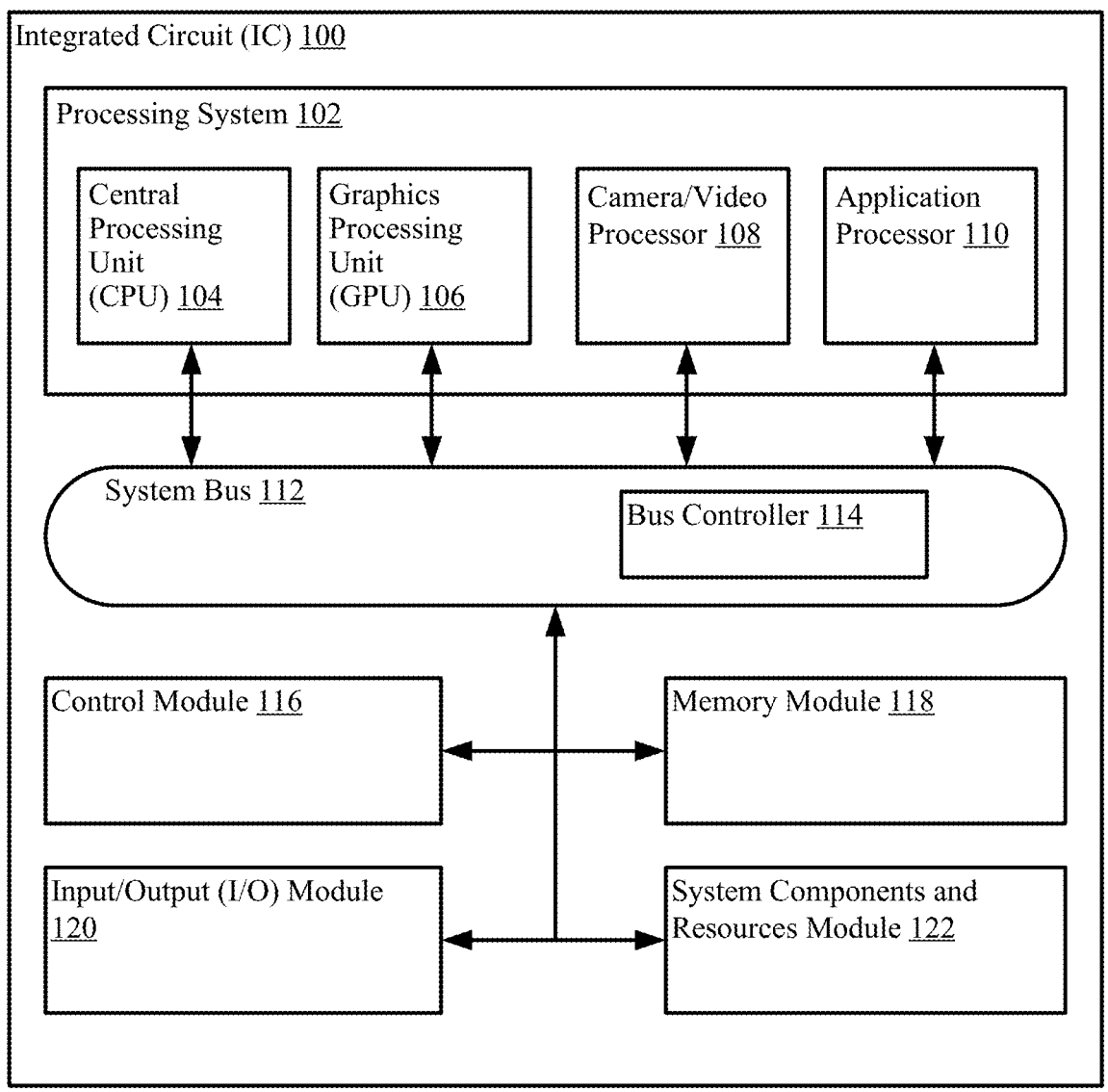
FIG. 1A is a block diagram of example subsystems and interconnections of a computing system suitable for implementing various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Although the teachings of this disclosure are illustrated in terms of integrated circuits (e.g., a system-on-chip (SoC)), the teachings are applicable in other areas. The teachings disclosed should not be construed to be limited to SoC designs or the illustrated embodiments. The various illustrative logical blocks, modules, and circuits described in connection with the present disclosure may be implemented or performed with a general purpose processor, a digital signal processor (DSP), an application specific integrated circuit (ASIC), a field programmable gate array (FPGA), or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of integrated circuits. The illustrated embodiments are merely vehicles to describe and illustrate examples of the inventive teachings disclosed herein.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.), any or all of which may be included in one or more cores. For example, a single integrated circuit (IC) chip or chip package may be configured to read and execute program instructions utilizing two or more independent processing units or cores (e.g., CPU cores, etc.) configured to read and execute program instructions.

A number of different types of memories and memory technologies are available or contemplated in the future, all of which are suitable for use with the various aspects. Such memory technologies/types include phase change memory (PRAM), dynamic random-access memory (DRAM), static random-access memory (SRAM), non-volatile random-access memory (NVRAM), pseudostatic random-access memory (PSRAM), double data rate synchronous dynamic random-access memory (DDR SDRAM), and other random-access memory (RAM) and read-only memory (ROM) technologies known in the art. A DDR SDRAM memory may be a DDR type 1 SDRAM memory, DDR type 2 SDRAM memory, DDR type 3 SDRAM memory, or a DDR type 4 SDRAM memory. Each of the above-mentioned memory technologies include, for example, computer-readable mediums having elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language.

Certain aspects of the present disclosure propose techniques for managing states of resources shared by multiple clients (e.g., "masters" or "bus masters"). For example, certain aspects relate to techniques for receiving and aggregating votes for resources required by the multiple clients, and selecting an entry from a plurality of entries in a system state table based on the aggregated votes. In some examples, each entry contains a plurality of configurable states corresponding to a plurality of shared resources. In this way, the states of shared resources are predetermined and stored based on use-case profiling of the SoC or integrated circuit (IC). The shared resources may be referred to as "physical resources" (e.g., busses, networks on a chip (NOCs), voltage rails, on-chip and off-chip memory devices, etc.) throughout the disclosure. Accordingly, the number of possible system states may be reduced to only the system states that are used.

For example, conventional techniques may rely on multiple levels of voting aggregation for selecting shared resource states, where hardware/software dependencies are arbitrated through overrides. However, such techniques are highly complex as they are configured to account for virtually every system state, including those that may never actually be used. Such systems have so many states that the entire system cannot be validated or tested. Thus, the techniques disclosed are directed to reducing the system states to a set of states that are used by the IC and are preconfigured to account for dependencies in certain hardware and software aspects of the IC. Such techniques improve the ability to test the IC by reducing the amount of time required to test, and by allowing testing to comprehensively test each of the preconfigured resource states to ensure proper functionality.

FIG. 1A is a block diagram conceptually illustrating an example hardware implementation of an integrated circuit (IC) 100 suitable for performing various aspects of the present disclosure. It should be noted that the IC 100 described with respect to FIG. 1A is merely an example structure of an IC, SoC, or other computing system, and any specific number of components (e.g., modules, processors, hardware components, software components, etc.) may be omitted for a particular implementation. The IC 100 may employ a processing system 102 that includes one or more processors configured to perform the various functions described throughout this disclosure. For example, the processing system 102, as utilized in the IC 100, may be used to execute instructions stored on a computer-readable medium to implement any one or more of the processes described herein, for example, in FIG. 4. In other examples within the scope of the present disclosure, the processes described herein may be operational by any other block or subsystem illustrated in FIG. 1A. For example, one or more of the processors (e.g., CPU 104, GPU 106, camera video processor 108, or application processor 110) or subsystems (e.g., bus controller 114, I/O module 120, memory module 118, control module 116, and system components and resources module 122) may be configured to implement any one or more of the processes described herein.

The processing system 102 may include a number of heterogeneous processors, such as a central processing unit (CPU) 104, a graphics processing unit 106, a camera/video processor 108, and an application processor 110. The processing system 102 may include one or more cores, and each processor/core may perform operations independent of the other processors/cores, and each processor/core may perform operations independent of the other processors/cores. The processors 104, 106, 108, and 110 may be organized in close proximity to one another (e.g., on a single substrate, die, integrated chip, etc.) so that they may operate at a much higher frequency/clock-rate than would be possible if the signals were to travel off-chip. The proximity of the cores may also allow for the sharing of on-chip memory and resources (e.g., voltage rail), as well as for more coordinated cooperation between cores.

The processing system 102 may be interconnected to a control module 116, a memory module 118, and other system components via a system bus 112, which may include an array of reconfigurable logic gates and/or implement a bus architecture (e.g., CoreConnect, advanced microcontroller bus architecture (AMBA), etc.). The system bus 112 may include any number of interconnecting buses and bridges depending on the specific application of the various processors 102, 104, 106, 108, and overall design constraints. The system bus 112 may communicate between the various modules and circuit components utilizing advanced interconnects, such as high performance networks-on-chip (NoCs). One or more of the NoCs may be implemented as an asynchronous NoC or a synchronous NoC. The system bus 112 may include or provide a bus controller 114 configured to grant the computing system 100 components (e.g., processors, peripherals, modules, subsystems, etc.) control of the bus (e.g., to communicate data) for a set duration, number of operations, number of bytes, etc. In one aspect, the bus controller 114 may enable processors and modules connected to the system bus 112 to operate as a master component and initiate and/or control memory transactions.

In some configurations, the memory module 118 may be coupled to or integrated (e.g., on the substrate, die, integrated chip, etc.) with the processing system 102. In other configurations, the memory module 118 may be external to the processing system 102, for example as a removable memory device or separate circuit. The memory module 118 may store instructions that are executable by a processor. To further illustrate, the memory module 118 may provide non-volatile storage, such as flash memory, for one or more of the processing system 102, control module 116, input/output (I/O) module 120, and/or the system components and resources module 122. The memory module 118 may include a cache memory to provide temporary storage of information to enhance processing speed of the IC 100. In some examples, the memory module 118 may be implemented as a universal flash storage (UFS) integrated into the IC 100, or as an external UFS card.

The control module 116 may be a specialized hardware module configured to manage the flow of data to and from the memory module 118, a processing system memory, or a memory device located off-chip (e.g., a flash memory device). In some examples, the control module 116 may include a UFS host device configured to receive various memory commands from multiple masters, and address and communicate the memory commands to a memory device. The multiple masters may include processors 104, 106, 108, 110, and/or multiple applications running on one or more of the processors 104, 106, 108, 110. The control module 116 may comprise one or more processors configured to perform operations disclosed herein. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The I/O module 120 may be configured for communicating with resources external to the IC 100. For example, the I/O module 120 includes an input/output interface (e.g., a bus architecture or interconnect) or a hardware design for performing specific functions (e.g., a memory, a wireless device, and a digital signal processor). In some examples, the I/O module includes circuitry to interface with peripheral devices, such as a memory device located off-chip.

The IC 100 may include a system components and resources module 122 for managing sensor data, analog-to-digital conversions, wireless data transmissions, and for performing other specialized operations (e.g., supporting interoperability between different devices). System components and resources module 122 may also include shared resources such as voltage rails, voltage regulators, oscillators, phase-locked loops, peripheral bridges, data controllers, system controllers, digital storage and memories, access ports, timers, and other similar components used to support the processors and software running on the IC 100. The system components and resources 122 may also include circuitry for interfacing with peripheral devices, such as cameras, electronic displays, wireless communication devices, external memory chips, etc. It should be noted that each processor and module may have different timing (e.g., clock signal), power, bandwidth, latency, and voltage requirements with regard to operation. For example, the processors and modules may be powered by two voltage rails: an embedded memory (MX) voltage rail and a core logic (CX) voltage rail. The MX voltage rail provides supply voltage to the various embedded memories. In contrast, the CX voltage rail provides supply voltage to the core logic.

In certain aspects, one or more processors and/or modules of the IC 100 may be configured to receive and/or implement instructions for controlling one or more states of the shared resources. The instructions may enable and/or direct the bus controller 114 to adjust states including bandwidth, latency, operating voltage, power state, etc., based on votes or "requests" for resources needed from different clients (e.g., CPU 104, graphics processing unit (GPU) 106, camera/video processor 108, application processor 110, etc.). A "vote" broadly indicates, among other things, whether the client anticipates being active or idle (i.e., inactive). More specifically, a vote may indicate a desired power state, such as a desired voltage level, bandwidth, and/or clock signal frequency.

Figure 1B:
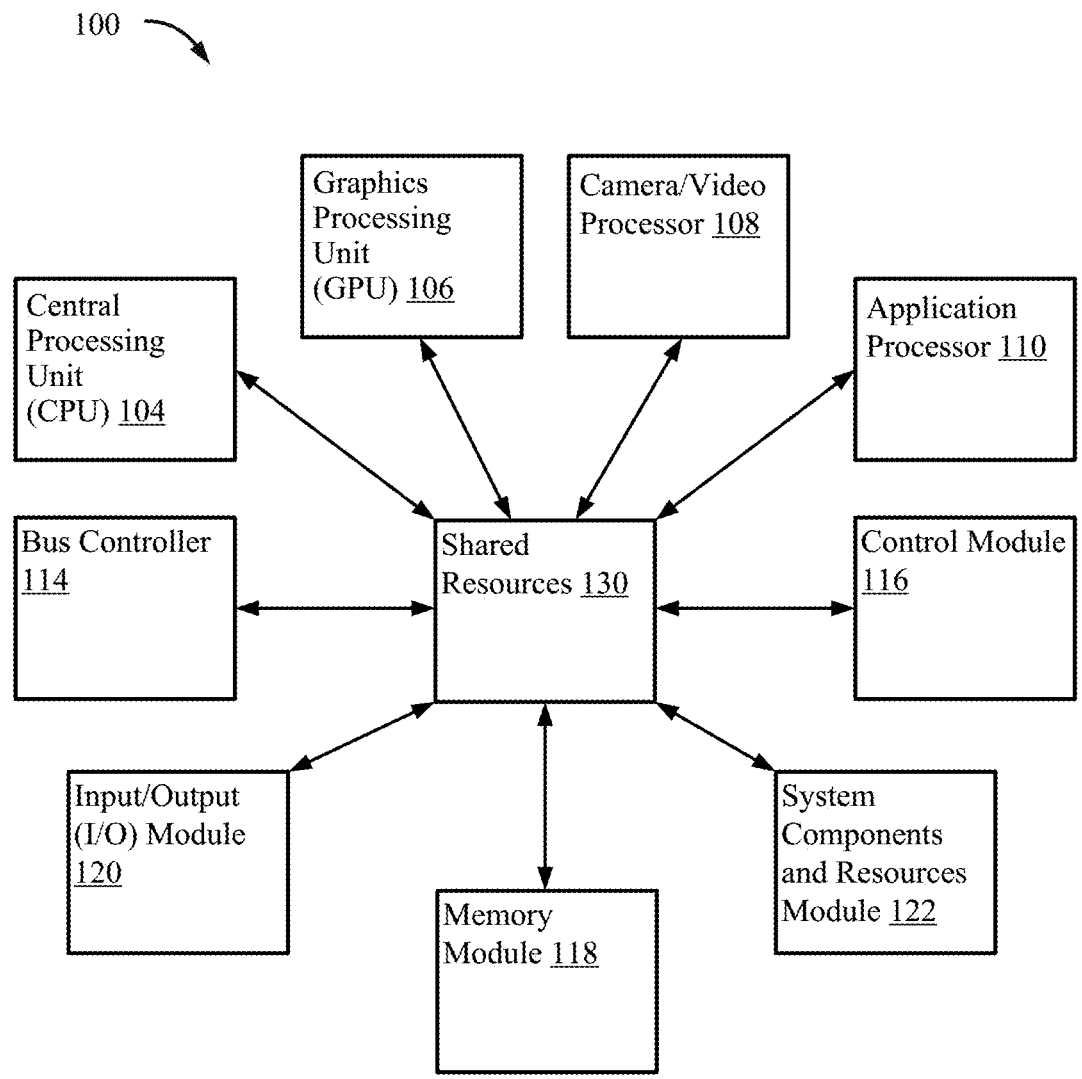
FIG. 1B is a block diagram conceptually illustrating an example of a computing system having a plurality of masters using shared resources, according to some aspects of the disclosure.

FIG. 1B is a block diagram conceptually illustrating an architecture of the IC 100, in accordance with aspects of the present disclosure. The IC 100 includes one or more shared resources 130 that are utilized by the processors and subsystems of the IC 100. The processors include, for example, CPU 104, GPU 106, camera/video processor 108, and application processor 110. Additionally, IC 100 includes subsystems such as the bus controller 114, I/O module 120, memory module 118, control module 116, and system components and resources module 122. Each of the processors and subsystems may access or request services from the one or more shared resources 130.

Shared resources 130 may, for example, include voltage rails, voltage regulators, oscillators, phase-locked loops, peripheral bridges, data controllers, system controllers, digital storage and memories, busses, networks on a chip (NOC), NOC ports, access ports, timers, and other similar components used to support the processors and software running on the IC 100. However, some processors and subsystems may also serve as a shared resource. For example, the GPU 106 may also be a shared resource that is called on to perform an image processing task or other graphics processing tasks. In another example, the system components and resources module 122, the bus controller 114, and the memory module 118 may include elements that are called on by various of the processors and subsystems to perform voltage and clock domain tasks (e.g., setting a voltage rail voltage, setting a frequency of a clock signal, setting a power state, etc.), memory read and write operations, and bandwidth tasks (e.g., setting a system bus bandwidth).

In certain aspects, the shared resources 130 may operate using operational parameters requested by one or more of the processors and subsystems. For example, operational parameters of a shared resource may include a particular voltage and/or a particular bandwidth or clock frequency. It should be noted that in certain aspects, although the shared resources 130 are physically independent of each other, one of more of the shared resources 130 may be characterized by a clock domain and/or voltage dependency. For example, a first clock domain of a first shared resource may always be higher or lower frequency relative to a second clock domain of a second shared resource. In another example, a first voltage rail corresponding to a memory subsystem (e.g., MX) may always be greater than or equal to a second voltage rail corresponding to a core logic voltage rail (e.g., CX).

As noted previously, conventional techniques for controlling shared resources 130 rely on multiple levels of voting aggregation (e.g., votes from several processors and subsystems are subject to successive aggregation and separation into distinct groups), where hardware/software dependencies are arbitrated through overrides (e.g., determining which processors and/or subsystems have voltage and/or clock dependencies that correspond to other processors and subsystems). These conventional techniques require significant man-hours for development and implementation, and in some cases, eliminate entire-system testing options. Thus, methods and apparatus configured to reduce the complexity associated with managing shared resources of IC 100 would improve the technology by reducing IC 100 complexity (e.g., number of system states, voltage domains, clock domains, clock plans, etc.), improving IC 100 quality (e.g., greater test coverage), and improving IC 100 performance (e.g., faster transitions between states).

Examples of Shared Resource Management

Figure 2:
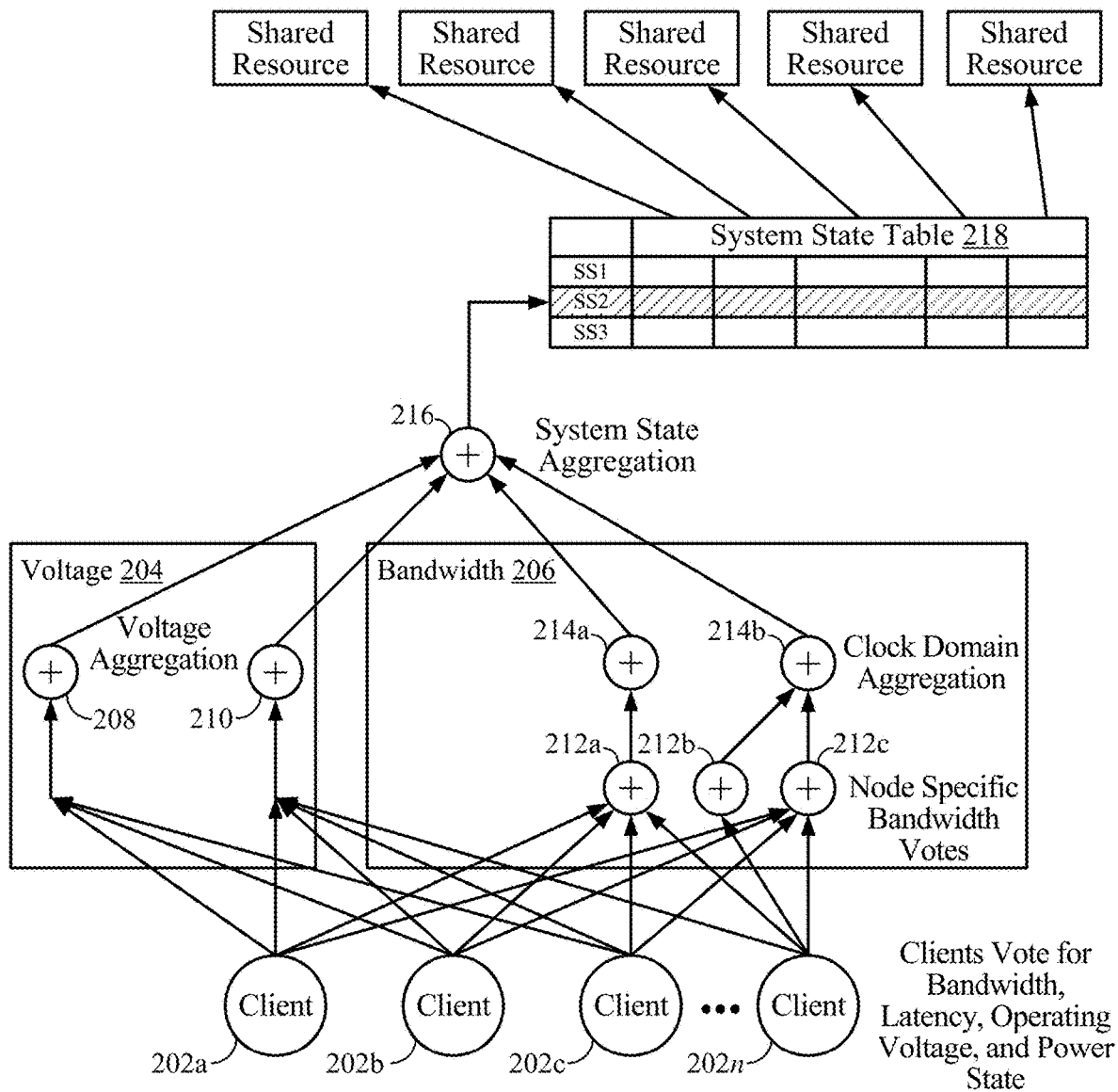
FIG. 2 is a block diagram conceptually illustrating an example system state aggregation, according to some aspects of the disclosure.

FIG. 2 is a block diagram illustrating an example method for managing shared resources on an integrated circuit (IC) (e.g., IC 100 of FIGS. 1A and 1B).

In this example, the IC 100 includes multiple clients 202a-202n (collectively referred to a clients 202), comprising any suitable number of clients operating in the IC 100. Each of the clients 202 may relate to one of the processors or subsystems illustrated in FIGS. 1A and 1B. For example, a first client 202a may include the memory module 118, a second client 202b may include the control module 116, a third client 202c may include the bus controller 114, and a fourth client 202n may include the GPU 106. It should be noted that the clients 202 may correspond to any additional processor or subsystem not explicitly mentioned herein that is suitable for operation on a system on a chip (SoC) or IC 100.

One or more of the multiple clients 202 may each cast one or more votes indicating a request for certain resources of a set of shared resources 130. In one example, the set of shared resources 130 may include one or more voltage rails or a bandwidth. For example, the first client 202a may provide a first vote requesting a particular voltage for an MX voltage rail and a second vote for a particular operating voltage of a CX voltage rail. For instance, if the first client 202a is entering into a low powered state, the requested voltage may be a low voltage relative to a voltage required for an active state. Alternatively, if the first client 202a is powering on, or exiting a low powered state, the requested voltage may be a high voltage relative to the voltage required for the lower powered state. The first client 202a may also request a particular bandwidth for communicating data, where the particular bandwidth corresponds to a frequency level of one or more clock signals corresponding to one or more clock domains.

It should be noted that in some examples, each client 202 may provide a plurality of different voltage votes to a voltage vote aggregator 204, with each vote indicating a desired voltage corresponding to one voltage rail. In some examples, a vote for a desired voltage may indicate a required voltage, an optimum voltage, or a maximum voltage. The maximum voltage may correspond to a maximum voltage available under the present power budget or electrical voltage constraint of the subsystem or processor. The required voltage may correspond to a minimum voltage required to run a particular subsystem or processor (e.g., running the subsystem or processor at a minimum frequency level) for its current workload. The optimum voltage may correspond to an energy efficient voltage level determined based on one or more of a temperature of the subsystem, a power draw of the subsystem, or a workload of the subsystem.

In certain aspects, the voltage vote aggregator 204 is configured to aggregate desired voltage votes according to a corresponding shared resource. For example, the voltage vote aggregator 204 may be configured to aggregate MX voltage rail votes 208 separately from CX voltage rail votes 210. In certain aspects, the voltage vote aggregator 204 aggregates votes by determines which vote has a voltage value that is greater than voltage values corresponding to other votes. That is, the voltage vote aggregator 204 receives one or more votes corresponding to one or more shared voltage resources, separates the one or more votes according to the particular shared resource that each vote corresponds to, determines, for each shared resource, which of vote is requesting the highest voltage value, and selects the relatively highest voltage value associated with the one or more votes for each of the MX voltage rail votes 208 and the CX voltage rail votes 210. The voltage vote aggregator 204 may then communicate the aggregated one or more votes to a system state aggregator 216.

Similarly, each client 202 may provide a plurality of different bandwidth votes indicating a desired bandwidth of a shared resource to a bandwidth aggregator 206. In some examples, a vote for a desired bandwidth may indicate a required bandwidth, an optimum bandwidth, or a maximum bandwidth. The maximum bandwidth may relate to the maximum bandwidth available under the present power budget of the subsystem or processor. The required bandwidth may correspond to a minimum bandwidth required to run a particular subsystem or processor at a particular power level (e.g., a minimum power level) for its current workload. The optimum bandwidth may correspond to a bandwidth for a most energy-efficient clock frequency based on the current temperature of the subsystem and its power draw.

In certain aspects, the bandwidth aggregator 206 is configured to aggregate desired bandwidth votes according to one or more of a corresponding shared resource and/or a particular node of the shared resource. In one example, the bandwidth aggregator 206 may be configured to separately aggregate first node bandwidth votes 212a, second node bandwidth votes 212b, and third node bandwidth votes 212c. As used herein, the term "node" may refer to a path or port on a bus or NOC configured to provide a communication path between subsystems and/or processors via the bus or NOC.

In certain aspects, the bandwidth aggregator 206 may also aggregate the bandwidth votes based on which clock domain the votes correspond to. In one example, the bandwidth aggregator 206 may be configured to separately aggregate first clock domain bandwidth votes 214a and second clock domain bandwidth votes 214b. In some examples, each clock domain corresponds to a separate shared resource, wherein one or more of the clock domains include one or more nodes corresponding to different portions of the same resource. For example, second node bandwidth votes 212b, and third node bandwidth votes 212c may correspond to the same clock domain, and may be aggregated as the second clock domain bandwidth votes 214b.

In some examples, if a plurality of bandwidth votes from different clients 202 all correspond to the same node of the same shared resource, the bandwidth aggregator 206 may aggregate the votes by summing the desired bandwidth values together. In some examples, if the plurality of bandwidth votes from different clients 202 all correspond to different nodes of the same shared resource, the bandwidth aggregator 206 may aggregate the votes by determining which desired bandwidth value is the highest relative to the other desired bandwidth values, and selecting the highest desired bandwidth value.

In some examples, if the plurality of bandwidth votes from different clients 202 all correspond to separate shared resources, then the bandwidth aggregator 206 may provide all the votes to the system state aggregator 216 for determination of a system state that satisfies all the votes.

Once the voltage vote aggregator 204 and the bandwidth aggregator 206 have each aggregated the plurality of votes from the clients 202, the aggregated votes (e.g., the relatively highest voltage value associated with the votes for each of the MX voltage rail votes 208 and the CX voltage rail votes 210, and the aggregated bandwidth values) are provided to a system state aggregator 216. The system state aggregator 216 may determine a suitable entry in a system state table 218. In some examples, the system state table 218 includes a plurality of columns and a plurality of rows, wherein each column in the plurality of columns corresponds to one of the plurality of shared resources, and wherein each row in the plurality of rows corresponds to one set of operational parameters for each of the shared resources. Thus, each row of the system state table 218 may correspond to a set of system states (e.g., a voltage and/or a clock frequency, etc.) for each of the shared resources.

In certain aspects, the system state aggregator 216 is configured to convert a bandwidth value received from the bandwidth aggregator 206 (e.g., a sum of the desired bandwidth values of votes received from the clients, or a relatively highest desired bandwidth value from the votes) from a bandwidth value to a clock frequency value. For example, a bandwidth value having units of megabytes-per-second (MB/s) may be converted to a clock frequency value having units of hertz (Hz). In some configurations, the system state aggregator 216 includes a conversion logic (e.g., a look-up table) to translate a desired bandwidth to a clock frequency.

The system state table 218 may be configured to account for dependencies in clock frequency and voltage across the plurality of shared resources. For example, each row of the system state table 218, or each set of system states, may include clock frequency values and voltage values that account for any dependencies within a single shared resource (e.g., among one or more nodes of the resource) or across multiple shared resources (e.g., a first voltage rail and a second voltage rail). FIG. 3 below provides an additional view and explanation of the system state table 218.

In one example scenario, the bandwidth voter may provide the system state aggregator 216 with a first bandwidth corresponding to a first shared resource, a second bandwidth corresponding to a second shared resource. The voltage vote aggregator 204 may provide the system state aggregator 216 with a first voltage corresponding to the first shared resource, and a second voltage corresponding to the second shared resource. In this example, the system state aggregator 216 may convert the first bandwidth into a first clock frequency, and convert the second bandwidth into a second clock frequency. Next, the system state aggregator 216 may select a row (e.g., a set of system states corresponding to a plurality of shared resources) from the system state table 218 that includes: (i) a clock frequency corresponding to the first shared resource that is greater than or equal to the first clock frequency, (ii) another clock frequency corresponding to the second shared resource that is greater than or equal to the second clock frequency, while also including (i) a voltage level corresponding to the first shared resource that is greater than or equal to the first voltage, and (ii) another voltage level corresponding to the second shared resource that is greater than or equal to the second voltage.

It should be noted that the foregoing scenario is exemplary, and not limiting. For example, the scope of the disclosure includes other scenarios wherein the votes for a desired operational parameter (e.g., voltage, bandwidth, clock frequency, etc.) come from one or more clients, and wherein the votes may correspond to one or more shared resources, and/or one or more nodes of the shared resources. Moreover, it should be noted that operational parameter dependencies between nodes and/or shared resources are accounted for in the system state table 218, thus, when a system state is selected based on the system state aggregator 216, any corresponding dependencies are reflected. In certain aspects, the system may include more than one system state table 218. For example, multiple system state tables may be used to manage the operation of shared resources. In one example, a first system state table may be configure to manage voltage of a plurality of shared resources, while a second system state table may be configured to manage clock frequencies of the plurality of shared resources. In such an example, the first table may be configured to act as a "master" table that, upon selection of a set of system states, automatically causes selection of a corresponding set of system states in the second table.

FIG. 3 illustrates an example system state table 218 (e.g., the system state table of FIG. 2), in accordance with certain aspects of the disclosure. It should be noted that the system state table 218 is an example, intended to provide an understanding of the disclosure. Accordingly, a system state table may include additional system states, shared resources, nodes, and operational parameters corresponding to the shared resources and nodes.

As illustrated in FIG. 3, the system state table 218 may be organized such that one or more top rows 302 of the table identify one or more columns. For example, a first field may be labeled "system state" to indicate that each row within that column corresponds to a separate set of system states (SS) (e.g., SS1, SS2, and SS3). The top rows 302 may also include identifiers labeling one or more of shared resources and nodes corresponding to the shared resource. In some examples, the table may include clock domains. As shown in FIG. 3, the top rows 302 include a first row identifying a memory controller as a shared resource, and under the memory controller, three clock domains that are part of the memory controller (e.g., memory NOC (MEM NOC), application processor 110 memory NOC (APPS MEM NOC), graphics processing unit memory NOC (GPU 106 MEM NOC)). It should be noted that in some examples, each NOC represents a separate clock domain. In this example, the memory controller may correspond to the memory module 118 of FIGS. 1A and 1B, the application processor may correspond to the application processor 110 of FIGS. 1A and 1B, and the graphics processing unit may correspond to the GPU 106 of FIGS. 1A and 1B.

Similarly, the top rows 302 include a first row identifying voltage rails as a shared resource, and under the voltage rails, two particular voltage rails (e.g., VDD CX and VDD MX). In this example the VDD MX and the VDD CX may correspond to a supply voltage for the memory voltage rail (VDD MS) and the voltage for a supply voltage for the core logic voltage rail (VDD CX). In some examples, the system state table 218 is configured to reflect a dependency between the VDD CX values and the VDD MX values for each of SS1, SS2, and SS3 (e.g., VDD MX>=VDD CX).

The system state table 218 may also include a set of bottom rows configured to indicate a set of operational values corresponding to each of SS1, SS2, and SS3. In this example, each set of operational values within the "Memory Controller" corresponds to a particular clock frequency, whereas each set of operational values within the "Voltage Rails" corresponds to a voltage level (e.g., a minimum supply voltage (MIN SVS) or a configurable nominal voltage level).

FIG. 4 is a flow chart illustrating an exemplary process 400 for system state management of shared resources. In some examples, the process 400 may be implemented by any of the computing systems described above and illustrated in FIGS. 1A and 1B. In other examples, the process 400 may be implemented by any suitable apparatus or means for carrying out the described functions.

At block 402, the process 400 starts by receiving (i) a first set of votes from a first client of a system, and (ii) a second set of votes from a second client of the system, wherein the first set of votes indicate a first desired set of operational parameters for controlling a plurality of physical resources in the system, wherein the second set of votes indicate a second desired set of operational parameters for controlling the plurality of physical resources, and wherein the plurality of physical resources are shared by the first client and the second client.

At block 404, the process 400 proceeds by selecting a first system state from a defined set of system states based on the first set of votes and the second set of votes, wherein each system state of the set of system states comprises a different set of operational parameters for the plurality of physical resources, wherein the first system state comprises a first set of operational parameters for operating the plurality of physical resources.

In certain aspects, the first desired set of operational parameters comprises a first desired operational parameter corresponding to a first physical resource of the plurality of physical resources; and the second desired set of operational parameters comprises a second desired operational parameter corresponding to the first physical resource.

In certain aspects, selecting the first system state further comprises determining which one of the first desired operational parameter or the second desired operational parameter is characterized by a voltage that is relatively greater than the other of the first desired operational parameter or the second desired operational parameter.

In certain aspects, the process 400 further includes aggregating a first desired bandwidth corresponding to the first desired operational parameter with a second desired bandwidth corresponding to the second desired operational parameter to generate an aggregated bandwidth; and converting the aggregated bandwidth into a corresponding clock frequency.

In certain aspects, selecting the first system state from the set of system states comprises determining which system state of the set of system states comprises a first operational parameter characterized by a first clock frequency that is greater than or equal to the corresponding clock frequency.

In certain aspects, the first physical resource comprises a plurality of nodes configured to provide a plurality of communication paths between a plurality of clients of the system.

In certain aspects, aggregating the first desired bandwidth with the second desired bandwidth further comprises determining whether the first desired operational parameter and the second desired operational parameter both correspond to a first node of the plurality of nodes.

In certain aspects, if both the first desired operational parameter and the second desired operational parameter correspond to the first node, aggregating the first desired bandwidth with the second desired bandwidth further comprises summing the first desired bandwidth with the second desired bandwidth; and if one of the first desired operational parameter and the second desired operational parameter does not correspond to the first node, aggregating the first desired bandwidth with the second desired bandwidth further comprises selecting one of the first desired bandwidth or the second desired bandwidth based on which of the first desired bandwidth or the second desired bandwidth is relatively greater than the other.

In certain aspects, the set of system states comprises a system state table having a plurality of columns and a plurality of rows, wherein each column in the plurality of columns corresponds to one of the plurality of physical resources, and wherein each row in the plurality of rows corresponds to one of the sets of operational parameters.

In certain aspects, each vote of the first set of votes and the second set of votes correspond to one of the plurality of physical resources.

In certain aspects, the first desired set of operational parameters and the second desired set of operational parameters includes at least one of a desired operating voltage or a desired operating bandwidth.

In certain aspects, the desired operating voltage is for a voltage rail, and wherein the desired operating bandwidth is for one or more of a network on a chip (NOC), an on-chip memory device, or an off-chip memory device.

Additional Considerations

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A method of system state management, comprising:
receiving (i) a first set of votes from a first client of a system, and (ii) a second set of votes from a second client of the system, wherein the first set of votes indicate a first desired set of operational parameters for controlling a plurality of physical resources in the system, wherein the first desired set of operational parameters comprises a first desired operational parameter corresponding to a first physical resource of the plurality of physical resources, wherein the second set of votes indicate a second desired set of operational parameters for controlling the plurality of physical resources, wherein the second desired set of operational parameters comprises a second desired operational parameter corresponding to the first physical resource, wherein the first physical resource comprises a plurality of nodes configured to provide a plurality of communication paths between a plurality of clients of the system, and wherein the plurality of physical resources are shared by the first client and the second client; and
selecting a first system state from a defined set of system states based on the first set of votes and the second set of votes, wherein each system state of the set of system states comprises a different set of operational parameters for the plurality of physical resources, wherein the first system state comprises a first set of operational parameters for operating the plurality of physical resources.

2. The method of claim 1, wherein selecting the first system state further comprises determining which one of the first desired operational parameter or the second desired operational parameter is characterized by a voltage that is relatively greater than the other of the first desired operational parameter or the second desired operational parameter.

3. The method of claim 1, further comprising:
aggregating a first desired bandwidth corresponding to the first desired operational parameter with a second desired bandwidth corresponding to the second desired operational parameter to generate an aggregated bandwidth; and
converting the aggregated bandwidth into a corresponding clock frequency.

4. The method of claim 3, wherein selecting the first system state from the set of system states comprises determining which system state of the set of system states comprises a first operational parameter characterized by a first clock frequency that is greater than or equal to the corresponding clock frequency.

5. The method of claim 3, wherein aggregating the first desired bandwidth with the second desired bandwidth further comprises determining whether the first desired operational parameter and the second desired operational parameter both correspond to a first node of the plurality of nodes.

6. The method of claim 5, wherein:
if both the first desired operational parameter and the second desired operational parameter correspond to the first node, aggregating the first desired bandwidth with the second desired bandwidth further comprises summing the first desired bandwidth with the second desired bandwidth; and
if one of the first desired operational parameter and the second desired operational parameter does not correspond to the first node, aggregating the first desired bandwidth with the second desired bandwidth further comprises selecting one of the first desired bandwidth or the second desired bandwidth based on which of the first desired bandwidth or the second desired bandwidth is relatively greater than the other.

7. The method of claim 1, wherein the set of system states comprises a system state table having a plurality of columns and a plurality of rows, wherein each column in the plurality of columns corresponds to one of the plurality of physical resources, and wherein each row in the plurality of rows corresponds to one of the sets of operational parameters.

8. The method of claim 1, wherein each vote of the first set of votes and the second set of votes correspond to one of the plurality of physical resources.

9. The method of claim 1, wherein the first desired set of operational parameters and the second desired set of operational parameters includes at least one of a desired operating voltage or a desired operating bandwidth.

10. The method of claim 9, wherein the desired operating voltage is for a voltage rail, and wherein the desired operating bandwidth is for one or more of a network on a chip (NOC), an on-chip memory device, or an off-chip memory device.

11. The method of claim 1, wherein the first system state is configured to account for one or more operational dependencies between the first physical resource and a second physical resource of the plurality of physical resources.

12. The method of claim 11, wherein the operational dependencies include one or more of a clock domain dependency or a voltage dependency between the first physical resource and the second physical resource.

13. The method of claim 1, wherein the first system state is configured to account for one or more operational dependencies between a first node and a second node of the plurality of nodes.

14. The method of claim 1, wherein the defined set of system states are configured to account for:
one or more operational dependencies between the first physical resource and a second physical resource of the plurality of physical resources; and
one or more operational dependencies between a first node and a second node of the plurality of nodes.

15. An apparatus for system state management, comprising:
a memory; and
a processor communicatively coupled to the memory, the processor configured to:
receive (i) a first set of votes from a first client of a system, and (ii) a second set of votes from a second client of the system, wherein the first set of votes indicate a first desired set of operational parameters for controlling a plurality of physical resources in the system, wherein the first desired set of operational parameters comprises a first desired operational parameter corresponding to a first physical resource of the plurality of physical resources, wherein the second set of votes indicate a second desired set of operational parameters for controlling the plurality of physical resources, wherein the second desired set of operational parameters comprises a second desired operational parameter corresponding to the first physical resource, wherein the first physical resource comprises a plurality of nodes configured to provide a plurality of communication paths between a plurality of clients of the system, and wherein the plurality of physical resources are shared by the first client and the second client; and select a first system state from a defined set of system states based on the first set of votes and the second set of votes, wherein each system state of the set of system states comprises a different set of operational parameters for the plurality of physical resources, wherein the first system state comprises a first set of operational parameters for operating the plurality of physical resources.

16. The apparatus of claim 15, wherein the processor, being configured to select the first system state, is further configured to determine which one of the first desired operational parameter or the second desired operational parameter is characterized by a voltage that is relatively greater than the other of the first desired operational parameter or the second desired operational parameter.

17. The apparatus of claim 15, wherein the processor is further configure to:
aggregate a first desired bandwidth corresponding to the first desired operational parameter with a second desired bandwidth corresponding to the second desired operational parameter to generate an aggregated bandwidth; and
convert the aggregated bandwidth into a corresponding clock frequency.

18. The apparatus of claim 17, wherein the processor, being configured to select the first system state from the set of system states, is further configured to determine which system state of the set of system states comprises a first operational parameter characterized by a first clock frequency that is greater than or equal to the corresponding clock frequency.

19. The apparatus of claim 17, wherein the processor, being configured to aggregate the first desired bandwidth with the second desired bandwidth, is further configured to determine whether the first desired operational parameter and the second desired operational parameter both correspond to a first node of the plurality of nodes.

20. The apparatus of claim 19, wherein:
the processor, being configured to aggregate the first desired bandwidth with the second desired bandwidth, is further configured to sum the first desired bandwidth with the second desired bandwidth if both the first desired operational parameter and the second desired operational parameter correspond to the first node; and
the processor, being configured to aggregate the first desired bandwidth with the second desired bandwidth, is further configured to select one of the first desired bandwidth or the second desired bandwidth based on which of the first desired bandwidth or the second desired bandwidth is relatively greater than the other if one of the first desired operational parameter and the second desired operational parameter does not correspond to the first node.

21. The apparatus of claim 15, wherein the memory is configured to store a set of system states comprising a system state table having a plurality of columns and a plurality of rows, wherein each column in the plurality of columns corresponds to one of the plurality of physical resources, and wherein each row in the plurality of rows corresponds to one of the sets of operational parameters.

22. The apparatus of claim 15, wherein each vote of the first set of votes and the second set of votes correspond to one of the plurality of physical resources.

23. The apparatus of claim 15, wherein the first desired set of operational parameters and the second desired set of operational parameters includes at least one of a desired operating voltage or a desired operating bandwidth.

24. The apparatus of claim 23, wherein the desired operating voltage is for a voltage rail, and wherein the desired operating bandwidth is for one or more of a network on a chip (NOC), an on-chip memory device, or an off-chip memory device.

25. A non-transitory computer-readable storage medium that stores instructions that when executed by a processor of an apparatus cause the apparatus to perform a method of system state management comprising:
receiving (i) a first set of votes from a first client of a system, and (ii) a second set of votes from a second client of the system, wherein the first set of votes indicate a first desired set of operational parameters for controlling a plurality of physical resources in the system, wherein the first desired set of operational parameters comprises a first desired operational parameter corresponding to a first physical resource of the plurality of physical resources, wherein the second set of votes indicate a second desired set of operational parameters for controlling the plurality of physical resources, wherein the second desired set of operational parameters comprises a second desired operational parameter corresponding to the first physical resource, wherein the first physical resource comprises a plurality of nodes configured to provide a plurality of communication paths between a plurality of clients of the system, and wherein the plurality of physical resources are shared by the first client and the second client; and
selecting a first system state from a defined set of system states based on the first set of votes and the second set of votes, wherein each system state of the set of system states comprises a different set of operational parameters for the plurality of physical resources, wherein the first system state comprises a first set of operational parameters for operating the plurality of physical resources.

26. The non-transitory computer-readable storage medium of claim 25, wherein selecting the first system state further comprises determining which one of the first desired operational parameter or the second desired operational parameter is characterized by a voltage that is relatively greater than the other of the first desired operational parameter or the second desired operational parameter.

27. The non-transitory computer-readable storage medium of claim 25, further comprising:
aggregating a first desired bandwidth corresponding to the first desired operational parameter with a second desired bandwidth corresponding to the second desired operational parameter to generate an aggregated bandwidth; and
converting the aggregated bandwidth into a corresponding clock frequency.

28. The non-transitory computer-readable storage medium of claim 27, wherein selecting the first system state from the set of system states comprises determining which system state of the set of system states comprises a first operational parameter characterized by a first clock frequency that is greater than or equal to the corresponding clock frequency.

29. An apparatus for system state management, the apparatus comprising:

means for receiving (i) a first set of votes from a first client of a system, and (ii) a second set of votes from a second client of the system, wherein the first set of votes indicate a first desired set of operational parameters for controlling a plurality of physical resources in the system, wherein the first desired set of operational parameters comprises a first desired operational parameter corresponding to a first physical resource of the plurality of physical resources, wherein the second set of votes indicate a second desired set of operational parameters for controlling the plurality of physical resources, wherein the second desired set of operational parameters comprises a second desired operational parameter corresponding to the first physical resource, wherein the first physical resource comprises a plurality of nodes configured to provide a plurality of communication paths between a plurality of clients of the system, and wherein the plurality of physical resources are shared by the first client and the second client; and means for selecting a first system state from a defined set of system states based on the first set of votes and the second set of votes, wherein each system state of the set of system states comprises a different set of operational parameters for the plurality of physical resources, wherein the first system state comprises a first set of operational parameters for operating the plurality of physical resources.

* * * * *